United States Patent
Bridge et al.

(10) Patent No.: US 9,055,421 B2
(45) Date of Patent: Jun. 9, 2015

(54) MESSAGING INTERFACE BASED ON CALLER OF AN INCOMING CALL

(75) Inventors: Henry Bridge, San Francisco, CA (US); Francis Luu, San Francisco, CA (US); Nathan Borror, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 13/571,882

(22) Filed: Aug. 10, 2012

(65) Prior Publication Data

US 2014/0045470 A1 Feb. 13, 2014

(51) Int. Cl.
*H04W 4/16* (2009.01)
*H04M 3/42* (2006.01)
*H04W 4/20* (2009.01)

(52) U.S. Cl.
CPC ............. *H04W 4/16* (2013.01); *H04W 4/206* (2013.01)

(58) Field of Classification Search
CPC ............ H04W 4/16; H04M 4/16; H04M 1/64
USPC ........ 379/88.19, 142.04; 370/352; 455/414.1, 455/415
See application file for complete search history.

(56) References Cited

U.S. PATENT DOCUMENTS

| | | | |
|---|---|---|---|
| 2003/0166409 A1* | 9/2003 | Ishii | 455/569 |
| 2010/0063891 A1* | 3/2010 | Townsend et al. | 705/26 |
| 2010/0098226 A1* | 4/2010 | Gupta et al. | 379/88.19 |
| 2011/0244840 A1* | 10/2011 | Tang | 455/415 |
| 2012/0196581 A1* | 8/2012 | Papakipos et al. | 455/415 |

OTHER PUBLICATIONS

U.S. Appl. No. 13/214,924, filed Aug. 22, 2011, Rose Yao.

* cited by examiner

*Primary Examiner* — Myron K Wyche
(74) *Attorney, Agent, or Firm* — Baker Botts L.L.P.

(57) ABSTRACT

In one embodiment, a method includes displaying by a mobile computing device of a first user a notification of an incoming call. The notification identifies a second user associated with a source of the incoming call. The method further includes detecting by the mobile computing device user input provided during the display of the notification of the incoming call. In response to the user input, one or more previous communications between the first and second users is determined by the mobile computing device. The method further includes displaying by the mobile computing device the one or more previous communications.

27 Claims, 4 Drawing Sheets

MESSAGING INTERFACE BASED ON CALLER OF AN INCOMING CALL

TECHNICAL FIELD

This disclosure generally relates to a messaging interface based on a caller of an incoming call.

BACKGROUND

Individuals may communicate with each other using a variety of methods including voice calls, video calls, email, text messaging, chatting, social networking messages, and other communication methods. A communication participant may select a method of communication based on a myriad of factors such as the cost of the communication method, the location or environment of one or more of the communication participants, the speed of the communication method, or other factors.

DESCRIPTION OF EXAMPLE EMBODIMENTS

In particular embodiments, a method includes displaying by a mobile computing device of a first user a notification of an incoming call. The notification may identify a second user associated with a source of the incoming call. The mobile computing device may detect user input provided during the display of the notification of the incoming call. In response to the user input, the mobile computing device may determine one or more previous communications between the first and second users and display the one or more previous communications.

Modern computer systems are able to communicate in a variety of ways. For example, a device may be capable of communication using voice calls, video calls, emails, text messaging, social media websites, and other communication methods. Such functionality may allow a user of the device to choose which type of communication to use in a communication session with another user. In certain situations, a certain type of communication may be preferable to other types of communication. For example, a user may select a communication type based on the cost, speed, or ease of use of the particular type of communication.

In certain situations, a user may receive a notification of an incoming call but may prefer to communicate with the caller using a different communication method. For example, the user may be in a location that is not conducive to communication via a call, such as a library or an area with poor signal reception. As another example, a user may have exhausted an allotment of minutes of a cellular phone plan. As yet another example, a user may not feel like talking on the phone. Particular embodiments of the present disclosure allow the user to enter user input to transition from a call notification interface to a messaging interface. The messaging interface may provide an option to send a message, such as a text message or email, to the caller in lieu of answering the call.

In some situations, a user may want to view previous communications with the caller before answering the call or communicating with the caller via a different communication type. In various embodiments, the messaging interface displays a conversation between the caller and the callee. The conversation may include previous communications between the caller and the callee. In particular embodiments, the communication view includes an aggregation of different communication types. The embodiments described above provide context for an incoming call and facilitate use of a preferred type of communication.

Figure 1:
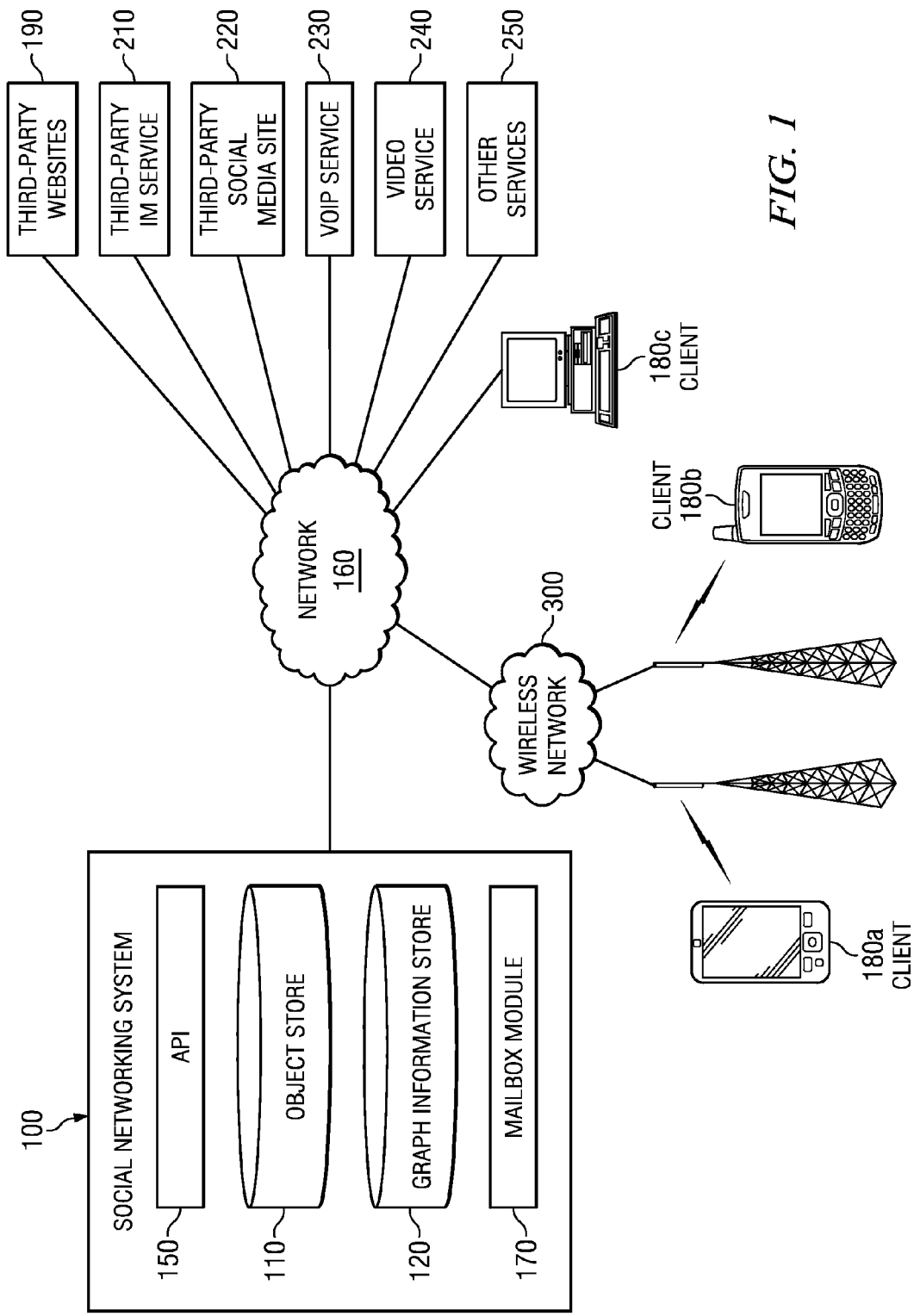
FIG. 1 illustrates an example social networking environment.

FIG. 1 illustrates an example social networking environment. The social networking environment may include a social networking system 100, client devices 180a, 180b, and 180c, wireless cellular network 300, and third-party services including third-party websites 190, third-party instant messaging (IM) service 210, third-party social media site 220, voice-over-Internet Protocol (VoIP) service 230, video service 240, and other third-party services 250. Client devices 180a and 180b are depicted as mobile phones and client device 180c is depicted as a desktop computer, but client devices 180 may comprise any type of mobile or stationary computing device, including a mobile phone, laptop, netbook, tablet, desktop computer, cable box, television, or other suitable device. Client devices 180a and 180b may connect to network 160 through wireless cellular network 300 and may be coupled to client device 180c through network 160.

Third-party websites 190 may include, but are not limited to, social-networking websites, shopping sites, review sites such as Yelp!, or any third-party website with which a user maintains an account to interact with content or other users. Third-party IM service 210 may include, but is not limited to, Google Chat or a similar service allowing users to send instant messages to each other. Third-party social media site 220 may include, but is not limited to, Twitter, LinkedIn, Google Plus, or other social media site. VoIP service 230 may include, but is not limited to, Skype or a similar service that offers voice calls over IP. Video service 240 may include, but is not limited to, FaceTime, Tango, or other similar service that offers video calls. Other services 250 may include e-mail servers, storage facilities, or other third-party services that may communicate with social networking system 100 or clients 180 through network 160.

A client device 180 may interact with the third-party services through a web browser or a dedicated application local to the client device 180. For example, a client devices 180 may interact with third-party instant messaging service 210, such as Google Chat, by logging into a user's Gmail account via a web browser or by installing and running a dedicated Google Talk application. Similarly, a client device 180 may interact with a third-party social media site 220, such as Twitter, via a browser or through a dedicated Twitter application. Client devices may similarly communicate with third-party websites 190, VoIP service 230, video service 240, and other third-party services 250.

A user of a client device 180 interacts with the social networking system 100 via an application, such as a web browser or a dedicated application of client device 180, to perform operations such as browsing content, posting and sending communications, retrieving and sorting communications received from other users, and the like. Communications may be in any suitable format such as electronic mail ("e-mail") messages, chat messages, comments left on a user's webpage, and short message service (SMS) text messages. Messages may contain text or other content such as pictures, videos, sounds, and attachments. Each user has a mailbox that includes communications that are both sent and received by the user.

Client device 180a may also interact with other client devices 180 through wireless network 300 or network 160. For example, client device 180a may participate in VoIP or non-VoIP calls with other cellular phones, computers, landlines, or other communication devices, transmit and receive texts or multi-media message through the SMS or multimedia messaging service (MMS) channels, or receive push notifications through the SMS control channel.

Third party services may interact with social networking system 100 via an application programming interface (API) 150. For example, a third party website 190 may perform operations supported by the API, such as delivering user communications to the social network system 100, retrieving user communications stored by the social networking system 100, and obtaining social information about users of the social networking system 100.

Social networking system 100 enables users to interact with each other through the system. The social networking system 100 may create and store a record, often referred to as a user profile, for each user. The user profile may include a user's contact information, background information, employment information, demographic information, personal interests, or other suitable information. Each user profile may be stored as an object in object store 110. The social networking system 100 may also create and store a record of a user's relationship with other users in the social networking system 100. In particular embodiments, this information may be stored as a social graph in graph information store 120. In the social graph, individuals, groups, entities, or organizations may be represented as nodes in the graph and the nodes may be connected by edges that represent one or more specific types of interdependency. Social networking system 100 may also provide services (e.g., wall-posts, photo-sharing, event organization, messaging, games, or advertisements) to facilitate social interaction between users in the social networking system 100. The social networking system 100 may transmit content and communications related to its services to a user's client device 180 over network 160.

Mailbox module 170 of social networking system 100 provides functionality for powering the messaging system of social networking system 100. In a particular embodiment, the mailbox module 170 receives, organizes, and presents communications to or from users in the social networking system 100 via an interactive user interface. The interactive user interface may be, for example, a webpage that is viewed by a user with a web browser or a dedicated application residing on the user's computing device 180. In particular embodiments, the interactive user interface may be a combination of server and client side rendering, depending on processing and bandwidth capacity. Functionality provided by mailbox module 170 may include organizing communications into conversations, quick reply, categorizing conversations, conversation states, conversation searching, new message notification, formatting of e-mails, forwarding communications between conversations, and invitation based conversion, among others. In particular embodiments, communications occurring outside of the social networking system 100 are aggregated with communications occurring through the social networking system by mailbox module 170 at any suitable time, such as when a client device 180 performs an aggregation operation. In particular embodiments, communications requiring interaction with third-party services are pulled automatically through one or more APIs 150 and stored at mailbox module 170. In particular embodiments, a mixture of client-push and server-pulls are used to aggregate communications from various sources at mailbox module 170. In particular embodiments, a local application on a client device 180 performs one or more of the operations of mailbox module 170 and pulls communications from social network 100 and third-party services to client device 180.

Network 160 may include one or more interconnected networks over which various systems and hosts described herein may communicate. This disclosure contemplates any suitable network 160. As an example and not by way of limitation, one or more portions of network 160 may include an ad hoc network, an intranet, a private network, an extranet, a virtual private network (VPN), a local area network (LAN), a wireless network, a wireless LAN (WLAN), a wide area network (WAN), a wireless WAN (WWAN), a metropolitan area network (MAN), a portion of the Internet, a packet-based wide-area network, a portion of the Public Switched Telephone Network (PSTN), a cellular telephone network, a satellite network, a paging network, or a combination of two or more of these.

Wireless cellular network 300 may include one or more interconnected networks over which various systems and hosts described herein may communicate. This disclosure contemplates any suitable wireless cellular network 300. For example, wireless cellular network 300 may include one or more base stations that communicate wirelessly with one or more client devices 180. Wireless cellular network may facilitate communication between client devices 180, network 160, and other components coupled to network 160.

Figure 2:
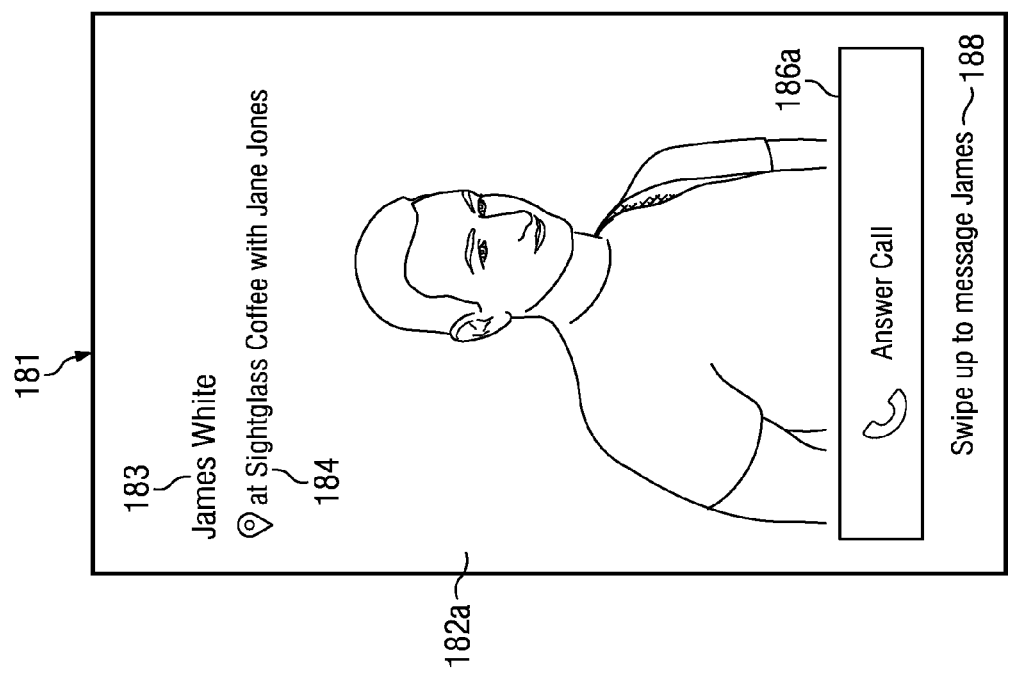
FIG. 2 illustrates an example call notification interface providing a notification of an incoming call from a caller.

FIG. 2 illustrates an example call notification interface 181 providing a notification of an incoming call from a caller. Call notification interface 181 may be displayed by device 180a in response to the reception of an incoming call. An incoming call includes a request to share information in a generally continuous fashion between device 180a and a device associated with the caller. As an example and not by way of limitation, the incoming call may be a request to initiate a voice call wherein the information shared includes audio information, a request to initiate a video call wherein the information shared includes audio and visual information, or a request to initiate any other suitable call.

The call notification interface 181 may display an indication to the callee that an incoming call is being received. For example, in the embodiment depicted, the indication includes an "answer call" button 186a that indicates that an incoming call is present and may be answered by pressing or otherwise selecting the button. As another example, the call notification interface 181 may also display any suitable information identifying the caller. By way of example and not limitation, the caller identification information may include the name of the caller, the phone number of the caller, a location associated with the caller such as a work or home address, or social context information describing social information that has been updated recently with respect to the time of the call, such as an activity that the caller is engaged in, the current location of the caller, or one or more individuals that the caller is with. In the embodiment depicted, the caller identification information includes a photo 182a of the caller, a name 183 of the caller, and social context information 184 indicating that the caller is at a particular business with a particular person. In particular embodiments, the caller identification information is obtained by performing a reverse lookup based on information that identifies the source of the incoming call such as the telephone number or network address of the caller. In particular embodiments, the telephone number, network address, or other identifying information may enable identification of a user profile of the caller that includes the caller identification information. The identified user profile may be a user profile stored by social networking system 100, a subset of the user profile stored by social networking system 100, or a set of information about the user that is separate from the user profile stored by social networking system 100. The user profile may be stored locally by device 180*a* or may be stored by one or more network devices (such as object store 110) that transmit the caller identification information to device 180*a* upon reception of a request from device 180*a*. For example, upon reception of an call, device 180*a* may transmit a telephone number, network address, or a profile identifier of the caller (if device 180*a* is able to ascertain the profile identifier locally) to social networking system 100 and receive the user profile in return.

In particular embodiments, call notification interface 181 provides instructions that specify how a transition to a messaging interface may be performed. For example, the instructions may indicate particular user input that may be entered to transition to the messaging interface. This is illustrated in FIG. 2, where instructions 188 direct the user to perform an upward swipe to message the caller. As another example, a transition button may be displayed along with instructions that indicate that pressing or otherwise selecting the button will result in a transition to the messaging interface. In other embodiments, the instructions are omitted. In a particular embodiment, the instructions are provided for a predetermined number of calls to instruct the user how to access the messaging interface and then may be omitted for future incoming calls.

Upon the detection of appropriate user input by device 180*a*, a messaging interface is displayed. Any suitable user input may result in the transition from the call notification interface to the messaging interface. For example, if device 180*a* includes a touch screen, any suitable gesture may be used to effectuate the transition to the messaging interface. Such gestures may include moving an object such as a finger or stylus along the screen in a particular pattern, swiping the touch screen (e.g., touching the screen with an object and quickly moving the object in a particular direction while maintaining contact with the screen), or contacting a particular area of the screen with an object one or more times. User input may also include the pressing of a mechanical button such as a key of a keypad or a button of a mouse.

Figure 3:
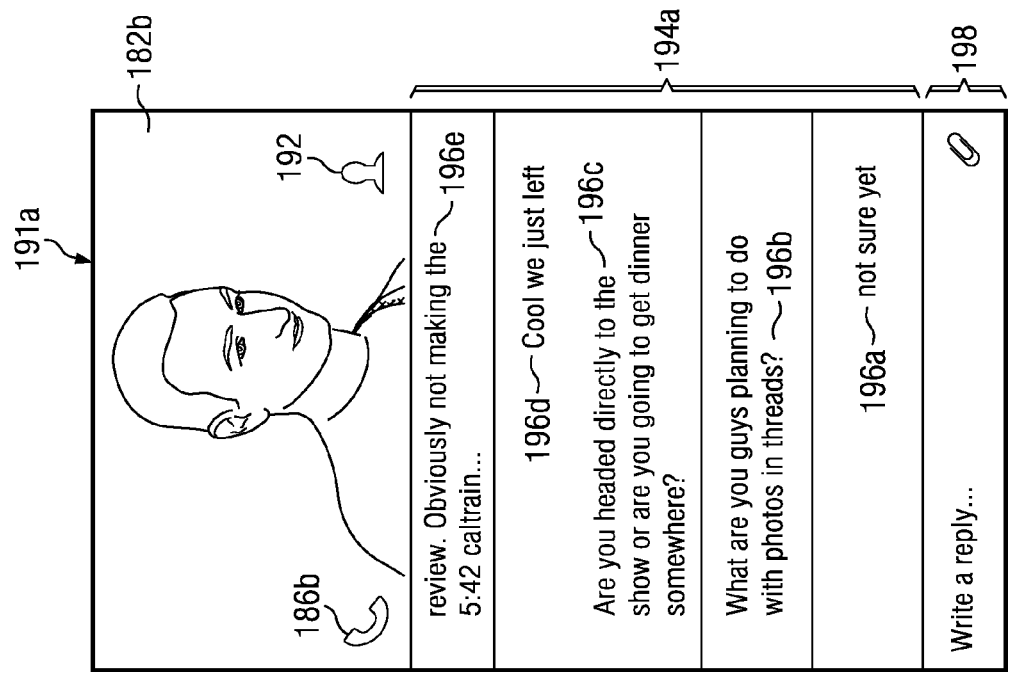
FIG. 3 illustrates an example messaging interface displaying a conversation between a caller and a callee.

FIG. 3 illustrates an example messaging interface 191*a* displaying a conversation 194*a* associated with a caller. Messaging interface 191*a* may be displayed in response to a detection of appropriate user input by client device 180*a* while an incoming call is being received. Messaging interface 191 may display any suitable caller identification information, such as that described above in connection with call notification interface 181. Messaging interface 191*a* may display the same caller identification information displayed in call notification interface 181 or messaging interface 191*a* may display additional or less caller identification information. In particular embodiments, the caller identification information is less prominent in messaging interface 191*a* than it is in call notification interface 181. For example, in the embodiment depicted, messaging interface 191 includes a smaller picture 182*b* of the caller. Such embodiments may increase the space available for conversation 194*a*. Messaging interface 191*a* may include one or more links 192 to additional information about the caller. For example, profile link 192 may link to a user profile of the caller when pressed or otherwise selected.

In particular embodiments, the user input that causes the transition to messaging interface 191*a* may also cause the incoming call to be rejected (e.g., the caller may be sent to voicemail or a busy signal may be played). In other embodiments, the user input does not cause the incoming call to be rejected. In such embodiments, messaging interface 191 may also display a notification of the incoming call. The notification may include any suitable indication of the incoming call, such as any indication described above with respect to call notification interface 181. In particular embodiments, the notification of the incoming call displayed by messaging interface 191*a* is less prominent than the notification of the incoming call displayed by call notification interface 181. In various embodiments, the callee may interact with a portion of the notification to answer or reject the incoming call. For example, in the embodiment depicted, messaging interface 191*a* includes incoming call notification icon 186*b* that may be touched or otherwise selected to cause device 180*a* to answer the incoming call.

Messaging interface 191*a* displays conversation 194*a* comprising communications 196 between the callee and the caller. At least some of these communications may have occurred prior to the incoming call. Communications 196 may be any suitable type of communications. For example, a communication 196 may be an SMS or MMS message, a call (e.g., a phone call, VoIP session, a video call), a voicemail, a push-to-talk (PTT) message, an email, an instant message, a tweet, a chat, a social network message (including a post on a wall of a social network website or a message sent via a social network website), or other communication between the caller and the callee. A communication 196 may include text exchanged during the communication (e.g., the actual text of the communication or a voice transcription of the communication) or any suitable information regarding the communication, such as the time or duration of the communication, whether the communication was an outgoing, incoming, or missed communication, or other suitable information.

A conversation 194 may include various types of communications 196 aggregated into a single communication thread. For example, if a user named Adam sends an instant message to a user named Bob and also separately sends an e-mail to Bob, both of these messages may be placed into the same conversation 194. Similarly, if Bob leaves Adam a voicemail, an indicator of the voicemail (such as the date and time it was left) or transcribed text from the voicemail may be placed into the conversation 194. As another example, if Adam calls Bob, the log of the call may also be placed in the conversation 194.

In particular embodiments, a conversation 194 displays communications 196 in the same format regardless of the types of the communications 196. For example, in the embodiment depicted in FIG. 3, the text of each communication 196 appears in a conversation bubble. Thus, each communication 196 of conversation 194*a* appears the same regardless of the type of the particular communication. In other embodiments, the format of a particular communication 196 is dependent on the type of the communication 196. For example, in the embodiment depicted in FIG. 3, each communication 196 includes one or more icons 197 depicting the type of communication or an attribute of the communication.

Conversation 194 may display communications 196 in any suitable order. For example, communications 196 may be ordered based on the time of the communications, the types of the communications, the importance of the communication, or any other suitable factor. In particular embodiments, communications 196 of a particular type may be grouped together, and the group including the most recent communication may be displayed first. In other embodiments, a particular communication 196 marked as important are displayed before the most recent communication 196. In some embodiments, a subset of communications 196 of a particular communication type are grouped together. For example, emails having a common subject may be grouped together.

In particular embodiments, the user of device 180*a* may configure various aspects of messaging interface 191*a*. For example, the user may select which caller identification information should be displayed, the format of the caller identification information, the ordering of communications 196 of conversation 194, which communication types are displayed in the conversation 194, or other suitable aspect of messaging interface 191*a*.

Communications 196 between the caller and the callee may be identified by device 180 in any suitable manner. The communications 196 may be stored at any suitable location, such as device 180, social networking system 100, a third-party service, or a combination of the preceding. An application local to device 180, residing at a server hosted by social networking system 100, or at another suitable network location may aggregate communications 196 between the caller and the callee, regardless of where the communications are stored. For example the communications 196 may be located on device 180, at social networking system 100, or at a third-party service. The aggregation of communications 196 may occur at any suitable time. For example, the aggregation may occur before the incoming call is received, in response to the incoming call being received, or in response to the user input that causes the transition to the messaging interface 191. In particular embodiments, an existing conversation 194 is updated at the time of the incoming call by aggregating additional communications 196 with the conversation.

In particular embodiments, the application may communicate with devices 180, social networking system 100, or third-party services 190, 210, 220, 230, 240, or 250 to aggregate communications 196 between the caller and callee into a conversation 194. For example, the application may receive communications 196 from the social networking system 100 or the third-party services and determine users that are participants in the communications 196. Accordingly, when the application receives a request for a conversation 194 between particular users (e.g., a caller and a callee), the application may identify communications 196 in which the users are participants.

In particular embodiments, social networking system 100 may facilitate determination of the participants in a communication 196. Users of social networking system 100 may be stored as objects in the social networking system 100. For example, as described above, object store 110 may include a profile for each user that comprises a profile name, an e-mail address, a profile picture, and other identifying information. Particular communications 196 may include identifying information that matches identifying information included in the profile of a user stored in object store 110. Accordingly, one or more users of the social networking system 100 that participated in the communication may be identified by accessing information stored by object store 110. For example, an e-mail from james.white@yahoo.com can be identified from information in the object store 110 as being an e-mail from the user James White. As another example, a video chat facilitated through third-party video service 240 may involve participants that each have a specific user ID. In particular embodiments, this user ID is stored with the user profile in object store 110 and used to identify the social network users that participated in the video chat.

A conversation 194 including communications 196 between the caller and callee may be obtained in any suitable manner. For example, information identifying the caller and callee may be passed to the application that aggregates the various communications 196 into conversations 194 and the application may return the appropriate conversation 194 between the caller and callee. Any suitable identifying information may be used to identify the caller and callee. For example, the telephone number, network address, user profile identifier, or other suitable identifying information may be used to identify the caller or callee.

Messaging interface 191*a* also includes a message entry area 198 that the callee may use to draft and transmit a communication 196 to the caller. Message entry area 198 may display a keyboard, activate a speech recognition application, or effectuate other text entry means in response to a touch or other selection from the callee. After text is entered via the keyboard, through the speech recognition application, or through other means, the text may be transmitted to the caller via any suitable format. By way of example and not limitation, the text may be transmitted according to a communication type described above. In particular embodiments, the default communication type used to transmit the text is an SMS message, but any other suitable type may be used such as an email or social network message. In a particular embodiment, the communication type is based on a telephone number, network address, or other identifier associated with the incoming call. For example, if the incoming call is associated with a mobile phone number, the communication type may default to an SMS message, whereas if the incoming call is associated with a home phone number, then a different communication type such as an email may be used. In particular embodiments, the communication type is selected based on the contact information available for the caller or the communication history between the caller and the callee. For example, if the majority of communications 196 between the caller and the callee are emails, the text entered in message entry area 198 may be sent via email. Message entry area 198 may also include the option to attach a file to the communication 196, such as a picture, video, document, or other file.

Conversation 194*a* can be updated in a real-time manner as new communications 196 are received or sent. Messaging interface 191*a* may allow a user to scroll backwards in time (or other order) to view the entire history of communications 196 in the conversation 194. In a particular embodiment, some of the communications have attachments such as pictures, videos, documents, or other files. The attachments can be shown in the messaging interface 191*a* through a preview of the attachment instead of just a link to the attachment. For example, an attached picture can be shown in the interface with a thumbnail of the picture.

Figure 4:
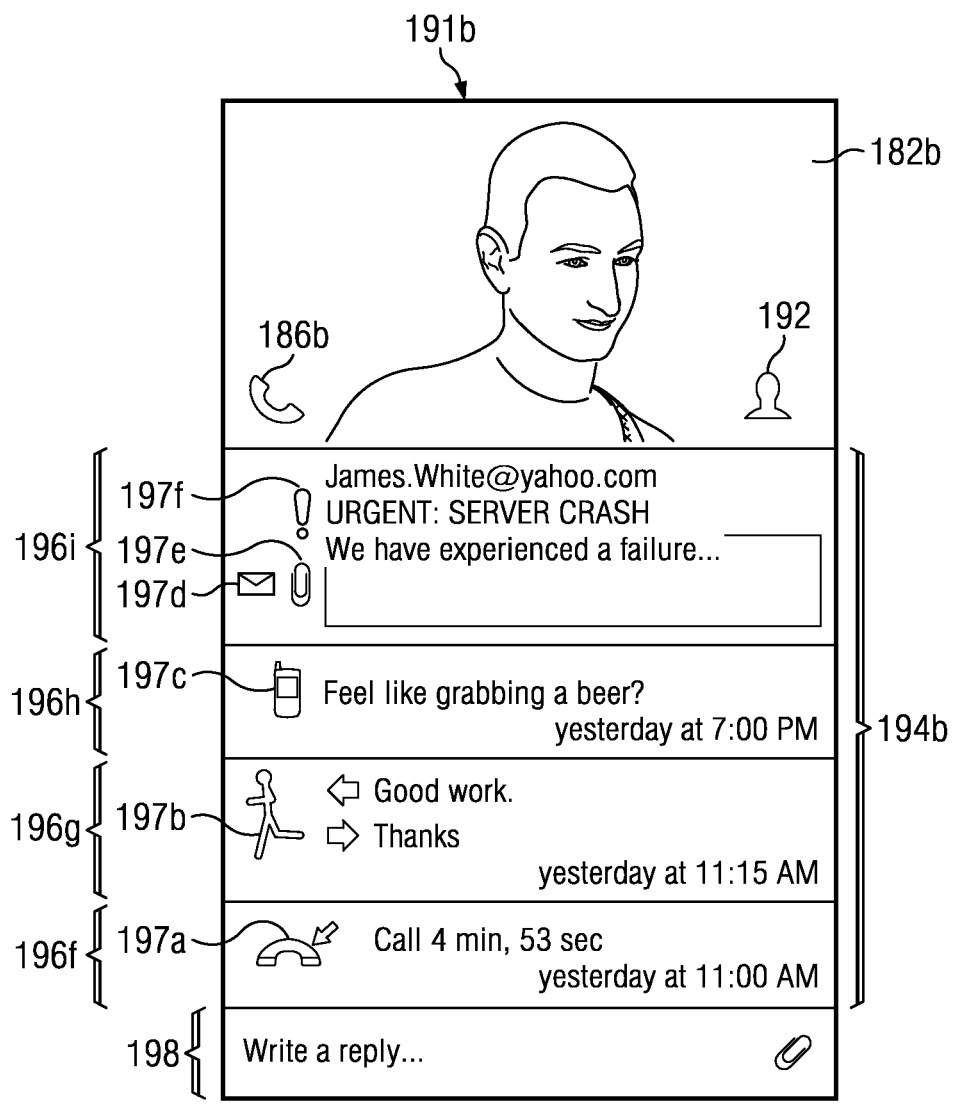
FIG. 4 illustrates an example messaging interface displaying a conversation including various types of communications.

FIG. 4 illustrates another example messaging interface 191*b* displaying a conversation 194*b* including various types of communications 196. The conversation 194*b* displayed depicts a one-on-one conversation between Bob Jones and James White that comprises a series of communications 196 of different types. Icons 197 within each communication 196 indicate the type of the communication 196. Icon 197*d* indicates that communication 196*i* is an e-mail. Icon 197*f* indicates the e-mail to Bob Jones was marked by James as "urgent." Icon 197*e* depicts a paperclip, representing that the email includes an attachment. Icon 197*c* indicates that communication 196*h* is a text message sent from a phone. Icon 197*b* indicates that the group of communications 196*g* are instant messages from the American Online Instant Messenger (AIM) service. Icon 197*a* indicates that communication 196*f* was an incoming phone call from James White. Communication 196f includes information indicating that the call was received yesterday at 11:00 AM and lasted 4 minutes, 53 seconds.

Figure 5:
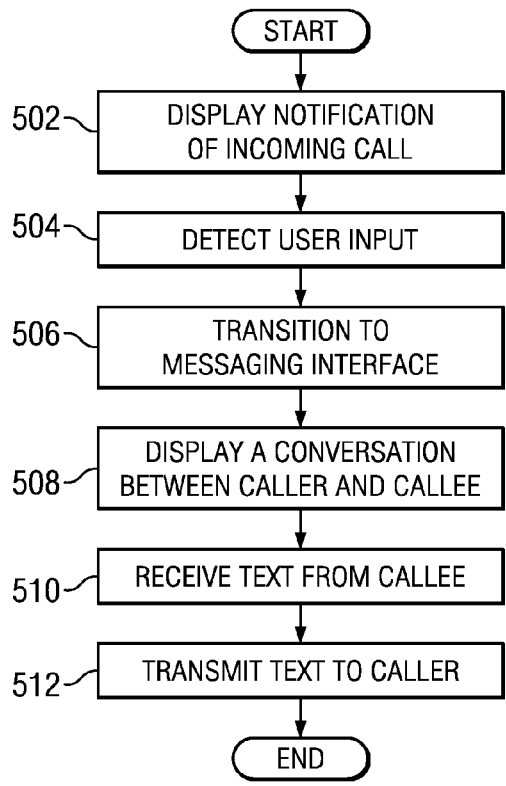
FIG. 5 illustrates an example method for providing a messaging interface based on a caller of an incoming call.

FIG. 5 illustrates an example method for providing a messaging interface 191 based on a caller of an incoming call. The method may begin at step 502, where notification of an incoming call is displayed. The notification may be displayed in response to the detection of an incoming call by client device 180. The notification may include any suitable information, such as a message that indicates that an incoming call is present and caller identification information associated with the source of the incoming call. At step 504, user input is detected. If the user input is entered while the notification of the incoming call is displayed and matches predetermined user input, the method moves to step 506. The user input may be any suitable gesture, such as a swipe performed on a touch screen, a press of a mechanical button, or other input. At step 506, the display of client device 180 transitions to a messaging interface 191. The messaging interface 191 may display a notification of the incoming call and a message entry area 198. The messaging interface 191 may also display a conversation 194 between the caller and the callee at step 508. The conversation 194 may include communications 196 between the caller and the callee that occurred prior to the initiation of the incoming call. The conversation 194 may include multiple different communication types aggregated into a single communication thread. At step 510, text from the callee is received. For example, the callee may input text via a keyboard or through a speech recognition application. At step 512, the text is transmitted to the caller using any suitable communication type and the method ends.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
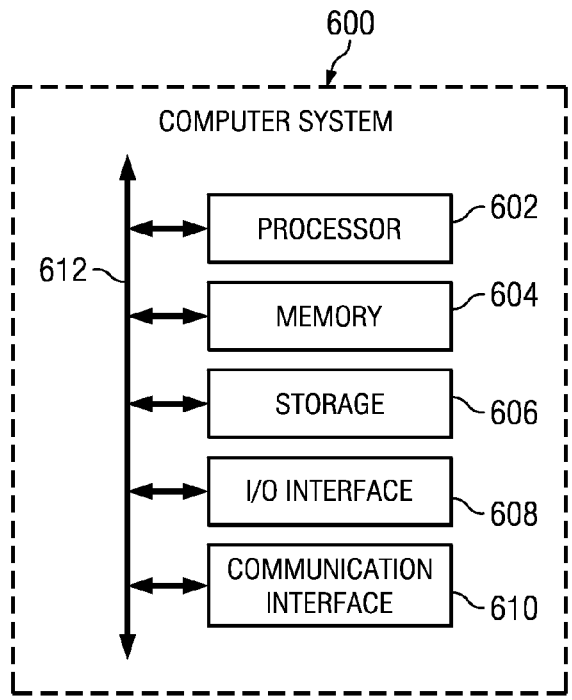
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. For example, client devices 180, social networking system 100, third-party services, network 160, and wireless cellular network 300 may each include one or more computer systems or portions thereof. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604.

Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   detecting by a mobile computing device of a first user an incoming call;
   in response to detecting the incoming call, displaying by the mobile computing device a notification of the incoming call in a first interface during an incoming call period, wherein the notification identifies a second user associated with a source of the incoming call, wherein the first user and the second user are both represented by nodes connected in a social graph, wherein the notification provides social context information about the second user, and wherein the incoming call period begins when the incoming call is detected and ends when the incoming call is terminated;
   detecting by the mobile computing device user input provided during the display of the notification of the incoming call; and
   in response to detecting the user input and during the incoming call period:
      determining by the mobile computing device one or more previous communications between the first and second users; and
      displaying by the mobile computing device the one or more previous communications in a second interface,
   wherein the one or more previous communications comprises at least one of a previous message sent by the first user to the second user and a previous message sent by the second user to the first user.

2. The method of claim 1, further comprising displaying by the mobile computing device at least a portion of the notification of the incoming call with the one or more previous communications.

3. The method of claim 2, further comprising answering the incoming call upon detection of a selection of an icon associated with the notification of the incoming call, the selection occurring while the at least a portion of the notification of the incoming call is displayed with the one or more previous communications.

4. The method of claim 1, further comprising rejecting the incoming call in response to the detection of the user input.

5. The method of claim 1, wherein the user input comprises a swipe of an object across a touch screen of the mobile computing device.

6. The method of claim 1, further comprising:
   displaying a message entry area in response to the detection of the user input; and
   transmitting a message received from the first user via the message entry area to the second user.

7. The method of claim 1, wherein displaying the one or more previous communications comprises displaying a first communication having a first communication type and a second communication having a second communication type distinct from the first communication type, the first communication type and second communication type each being one of a short message service (SMS) message, a multimedia messaging service (MMS) message, an email message, an instant message, a chat message, a message posted on a social media website, a voice call, a video call, a push-to-talk (PTT) message, or a voice message.

8. The method of claim 7, wherein the first communication and the second communication are displayed without an indication of the first communication type or the second communication type.

9. The method of claim 7, further comprising displaying an indication of the first communication type and an indication of the second communication type.

10. An apparatus comprising:
a processor operable to:
  detect an incoming call;
  in response to detecting the incoming call, display to a first user a notification of the incoming call in a first interface during an incoming call period, wherein the notification identifies a second user associated with a source of the incoming call, wherein the first user and the second user are both represented by nodes connected in a social graph, and wherein the notification provides social context information about the second user, and wherein the incoming call period begins when the incoming call is detected and ends when the incoming call is terminated;
the first interface operable to:
  receive user input provided during the display of the notification of the incoming call; and
wherein the processor is further operable to:
  in response to detecting the user input and during the incoming call period:
    determine one or more previous communications between the first and second users; and
    display the one or more previous communications in a second interface,
  wherein the one or more previous communications comprises at least one of a previous message sent by the first user to the second user and a previous message sent by the second user to the first user.

11. The apparatus of claim 10, wherein the processor is further operable to display at least a portion of the notification of the incoming call with the one or more previous communications.

12. The apparatus of claim 10, wherein the processor is further operable to reject the incoming call in response to the detection of the user input.

13. The apparatus of claim 10, further comprising a touch screen and wherein the user input comprises a swipe of an object across the touch screen.

14. The apparatus of claim 10, wherein the processor is further operable to:
  display a message entry area in response to the detection of the user input; and
  transmit a message received from the first user via the message entry area to the second user.

15. The apparatus of claim 10, wherein displaying the one or more previous communications comprises displaying a first communication having a first communication type and a second communication having a second communication type distinct from the first communication type, the first communication type and second communication type each being one of a short message service (SMS) message, a multimedia messaging service (MMS) message, an email message, an instant message, a chat message, a message posted on a social media website, a voice call, a video call, a push-to-talk (PTT) message, or a voice message.

16. One or more non-transitory computer readable media comprising logic operable to:
  detect an incoming call;
  in response to detecting the incoming call, display to a first user a notification of the incoming call in a first interface during an incoming call period, wherein the notification identifies a second user associated with a source of the incoming call, wherein the first user and the second user are both represented by nodes connected in a social graph, wherein the notification provides social context information about the second user, and wherein the incoming call period begins when the incoming call is detected and ends when the incoming call is terminated;
  detect user input provided during the display of the notification of the incoming call;
  in response to detecting the user input and during the incoming call period:
    determine one or more previous communications between the first and second users; and
    display the one or more previous communications in a second interface,
  wherein the one or more previous communications comprises at least one of a previous message sent by the first user to the second user and a previous message sent by the second user to the first user.

17. The media of claim 16, wherein the logic is further operable to display at least a portion of the notification of the incoming call with the one or more previous communications.

18. The media of claim 16, wherein the logic is further operable to reject the incoming call in response to the detection of the user input.

19. The media of claim 16, wherein the user input comprises a swipe of an object across a touch screen of a mobile computing device.

20. The media of claim 16, wherein the logic is further operable to:
  display a message entry area in response to the detection of the user input; and
  transmit a message received from the first user via the message entry area to the second user.

21. The media of claim 16, wherein displaying the one or more previous communications comprises displaying a first communication having a first communication type and a second communication having a second communication type distinct from the first communication type, the first communication type and second communication type each being one of a short message service (SMS) message, a multimedia messaging service (MMS) message, an email message, an instant message, a chat message, a message posted on a social media website, a voice call, a video call, a push-to-talk (PTT) message, or a voice message.

22. The media of claim 21, wherein the first communication and the second communication are displayed without an indication of the first communication type or the second communication type.

23. The media of claim 21, wherein the logic is further operable to display an indication of the first communication type and an indication of the second communication type.

24. The media of claim 17, wherein the logic is further operable to answer the incoming call upon detection of a selection of an icon associated with the notification of the incoming call, the selection occurring while the at least a portion of the notification of the incoming call is displayed with the one or more previous communications.

25. The apparatus of claim 11, wherein the processor is further operable to answer the incoming call upon detection of a selection of an icon associated with the notification of the incoming call, the selection occurring while the at least a portion of the notification of the incoming call is displayed with the one or more previous communications.

26. The apparatus of claim 15, wherein the first communication and the second communication are displayed without an indication of the first communication type or the second communication type.

27. The apparatus of claim 15, wherein the processor is further operable to display an indication of the first communication type and an indication of the second communication type.

* * * * *